United States Patent [19]

Sasaki et al.

[11] Patent Number: 4,938,098

[45] Date of Patent: Jul. 3, 1990

[54] POWER UNIT FOR MOTOR VEHICLE

[75] Inventors: Kenichi Sasaki, Yokohama; Yoshio Iwasa, Nagareyama, both of Japan

[73] Assignee: Nissan Motor Co., Ltd., Yokohama, Japan

[21] Appl. No.: 289,707

[22] Filed: Dec. 27, 1988

[30] Foreign Application Priority Data

Dec. 28, 1987 [JP] Japan ............................ 62-201239[U]
Sep. 21, 1988 [JP] Japan ............................ 63-122805[U]

[51] Int. Cl.⁵ ............................................ F16H 37/08
[52] U.S. Cl. .................................... 475/200; 475/206
[58] Field of Search .................................. 74/700, 701

[56] References Cited

U.S. PATENT DOCUMENTS

| | | | |
|---|---|---|---|
| 2,821,868 | 2/1958 | Gregory | 74/701 X |
| 3,017,787 | 1/1962 | Payne | 74/701 |
| 3,327,556 | 6/1967 | Blavette | 74/701 |
| 3,350,960 | 11/1967 | Lamburn et al. | 74/701 |
| 3,411,382 | 11/1968 | Mori | 74/701 X |
| 3,446,094 | 5/1969 | Ohno et al. | 74/701 X |
| 3,453,904 | 7/1969 | Dangauthier | 74/701 X |
| 3,489,037 | 1/1970 | Mori et al. | 74/701 X |
| 3,703,107 | 11/1972 | Piret | 74/701 |
| 4,163,399 | 8/1979 | Yamada et al. | 74/701 X |
| 4,283,968 | 8/1981 | Kalns | 74/701 |
| 4,606,243 | 8/1986 | Ashikawa et al. | 74/700 |
| 4,700,800 | 10/1987 | Friedrich et al. | 74/701 X |

FOREIGN PATENT DOCUMENTS

| | | |
|---|---|---|
| 58-46248 | 3/1983 | Japan . |
| 170559 | 9/1984 | Japan ............ 74/701 |
| 623250 | 5/1949 | United Kingdom . |
| 847302 | 9/1960 | United Kingdom . |
| 987189 | 3/1965 | United Kingdom . |
| 1162081 | 8/1969 | United Kingdom . |
| 1171631 | 11/1969 | United Kingdom . |
| 2179604A | 3/1987 | United Kingdom . |

*Primary Examiner*—Dwight Diehl
*Attorney, Agent, or Firm*—Lowe, Price, Leblanc, Becker & Shur

[57] ABSTRACT

A power unit is provided for a motor vehicle, and includes an in-line engine, a transmission arranged alongside the engine, structure for transmitting the power of the engine to the transmission, and a differential gear connected to the transmission. In one aspect of the invention, power is delivered from a gear mounted at one end of the engine crankshaft to an intermediate shaft operatively connected to the transmission. In another aspect of the invention, the gear is mounted to a middle portion of the crankshaft. Such structure reduces the length of the power unit, especially for multi-cylinder engines, and makes the power unit particularly suitable for front-wheel drive and four-wheel drive vehicles.

16 Claims, 6 Drawing Sheets

POWER UNIT FOR MOTOR VEHICLE

BACKGROUND OF THE INVENTION

1. Field of the Invention

The present invention relates in general to power units for motor vehicles, and more particularly to power units of a type designed for use in a front-engine front-drive motor vehicle.

2. Description of the Prior Art

Hitherto, so-called FF-type (i.e., front engine, front drive) motor vehicles have been widely used for various reasons. In the vehicles of this type, the power unit including an engine and transmission is arranged transversely with respect to the vehicle body.

One of the conventional power units used for such FF-type motor vehicle is disclosed in Japanese Patent First Provisional Publication No. 58-46248. In the power unit of this reference, the engine and transmission are aligned or arranged in series to have a common axis which, when the unit is practically mounted to the vehicle, is transversely disposed with respect to the fore-and-aft axis of the vehicle. A differential gear is mounted beside one longitudinal end of the power unit with a transfer shaft extending along the axis of the transmission.

However, due to the inherent arrangement wherein the engine and transmission are aligned, the axial length of the power unit becomes great when a relatively long engine, such as in-line 6-cylinder engine, is used. In this case, mounting such power unit onto a vehicle body becomes difficult because the width of the vehicle body has its limit.

Of course, using a so-called V-type engine eliminates this drawback. However, as is well known, the V-type engines are inferior to the in-line engines in maintenance, inspection conveniency and productivity.

SUMMARY OF THE INVENTION

It is therefore an object of the present invention to provide a power unit for F—F type motor vehicles, which is constructed relatively short in length even with an in-line engine.

According to the present invention, there is provided a power unit comprising an in-line engine having a crankshaft and a transmission having a gear-shaft arranged alongside the engine so that the gear-shaft is parallel to the crankshaft, wherein the power transmission from the engine to the transmission is achieved by using an intermediate shaft between the crankshaft and the gearshaft and parallel to both.

According to one aspect of the present invention, there is provided a power unit comprising an in-line engine and a transmission arranged alongside the engine, wherein the power transmission from the engine to the transmission is made by using an output gear which is secured to one axial end of the crankshaft of the engine.

According the present invention, there is provided a power unit for a motor vehicle, which comprises a multi-cylinder in-line engine; a transmission arranged alongside the engine; means for transmitting the power of the engine to the transmission; and a differential gear connected to the transmission in an arrangement that facilitates mounting of the power unit in a front portion of a front-wheel or four wheel drive vehicle.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Referring to FIGS. 1 to 4, there is shown a power unit according to a first, preferred, embodiment of the present invention.

Figure 1:
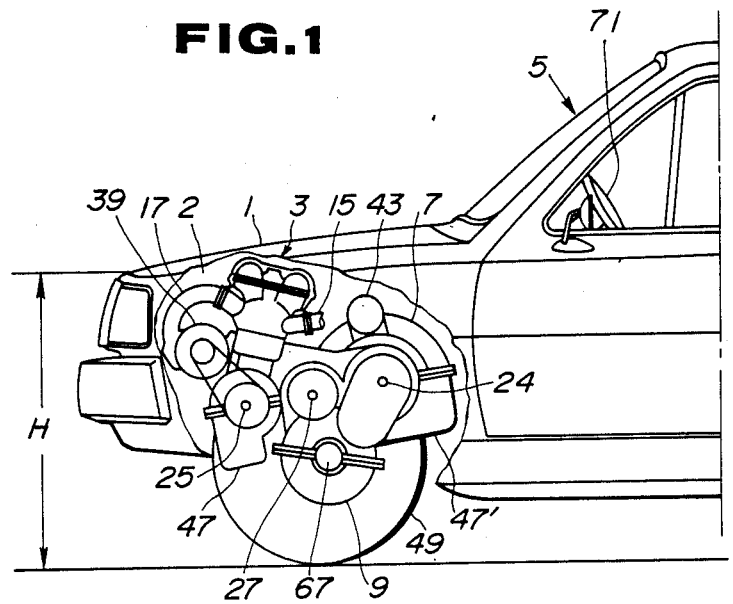
FIG. 1 is a partially cut-away side view of an engine-mounting front portion of a motor vehicle, showing a power unit mounted in the engine room according to a preferred embodiment of the present invention.

FIG. 1 shows a front portion of a motor vehicle body 5, in which the power unit is practically mounted. The front portion comprises an engine room 2 having an upper portion covered with a hood 1. Designated by numeral 71 is a steering wheel.

Figure 2:
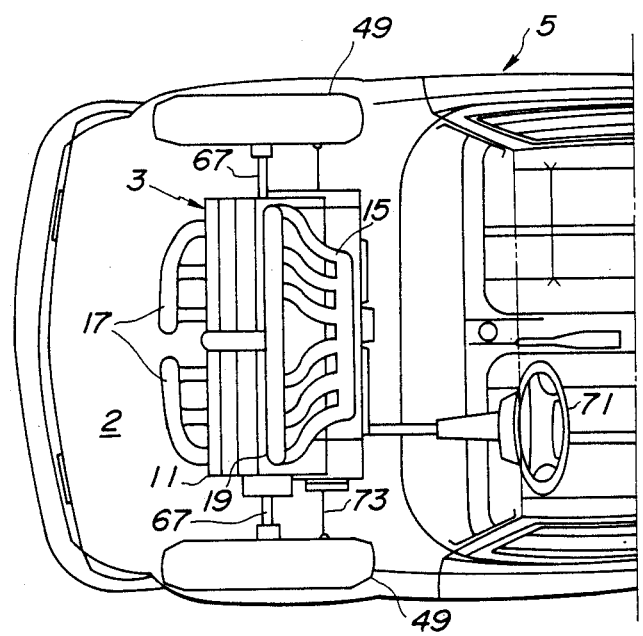
FIG. 2 is a plan view of the front portion of the motor vehicle with an engine room hood removed.

As is seen from FIG. 2, an engine 3 of in-line 6 cylinder type is arranged transversely with respect to the vehicle body 5. A transmission 7 is arranged behind (in a front-to-back longitudinal direction of the vehicle) and alongside the engine 3, and a differential gear 9 is arranged below the transmission 7. The engine 3, the transmission 7 and the differential gear 9 are bolted to one another to constitute a power unit. As is seen from FIG. 3, the engine 3 is inclined toward the transmission, that is, toward the rear of the vehicle body 5. The transmission 7 may be of a manual type or an automatic type.

Figure 3:
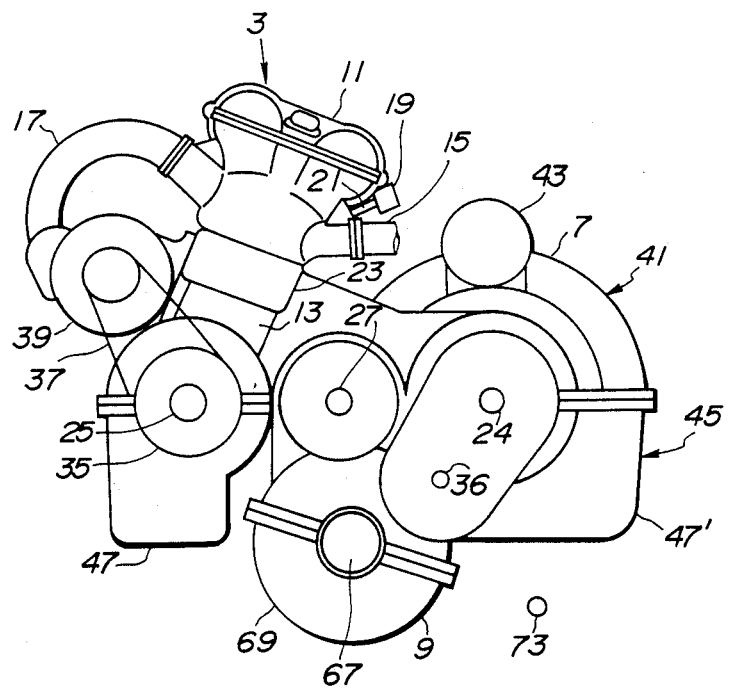
FIG. 3 is an enlarged side view of the power unit of the preferred embodiment.

As is clearly shown in FIGS. 2 and 3, the engine 3 comprises a cylinder head 11 and a cylinder block 13. To the cylinder block 13, there are connected intake tubes 15 and exhaust tubes 17. Each intake tube 15 is equipped with a fuel injection valve 21 for injecting fuel into a corresponding combustion chamber of the engine 3. Designated by numeral 19 is a fuel gallery for conveying the fuel to each fuel injection valve 21. Designated by numeral 73 in FIG. 3 is a steering rod.

The transmission 7 is arranged behind and alongside the cylinder block 13. Designated by numeral 23 is a rear side wall of the cylinder block 13. A torque from the crankshaft 25 of the engine 3 is transmitted to a gear shaft 24 of the transmission 7 through an intermediate shaft 27. As shown, the axes of the crankshaft 25, gear shaft 24 and intermediate shaft 27 lie on an imaginary common plane.

Figure 4:
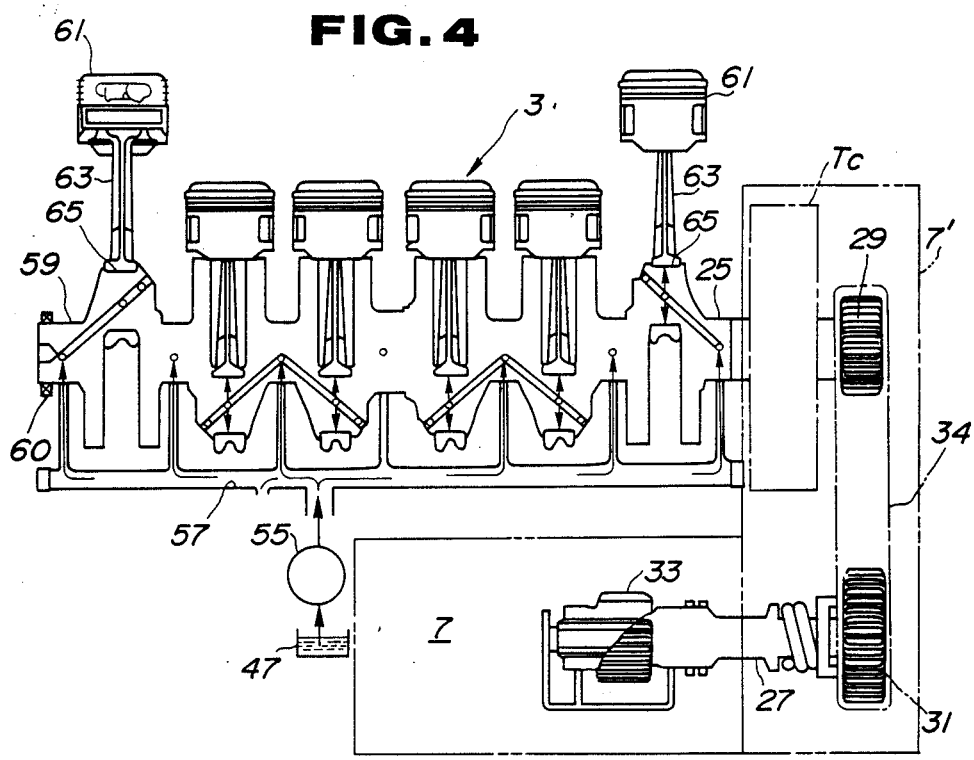
FIG. 4 is a schematical illustration showing essential parts of the power unit of the preferred embodiment.

The manner of conveying the power output of the engine through the intermediate shaft 27 is schematically illustrated in FIG. 4.

The crankshaft 25 has at one axial end a gear 29, and the intermediate shaft 27 has at one end a first gear 31 and at the other end a second gear 33. The gear 29 and the first gear 31 are operatively connected through a chain 34 to achieve a power transmission connection between the crankshaft 25 and the intermediate shaft 27. The second gear 33 is engaged with a gear (not shown) mounted on the gear shaft 24 of the transmission 7 thereby to achieve a power transmission connection between the intermediate shaft 27 and the gear shaft 24. The power transmission from an output shaft to the differential gear 9 is made through a shaft 36 and several gears (not shown).

As is shown in FIG. 3, at a front side of the cylinder block 13, there is arranged an alternator 39 which is driven by the crankshaft 25. That is, a belt 37 from the alternator 39 is put around a crank pulley 35 secured to an end of the crankshaft 25.

Designated by numeral 41 is an upper case which covers respective upper portions of the intermediate shaft 27 and the gear shaft 24 and is bolted to the rear side of the cylinder block 13. A starter 43 is mounted to the upper case 41. Designated by numeral 45 is a lower case which covers respective lower portions of the intermediate shaft 27 and the gear shaft 24 and is bolted to the upper case 41. The lower case 45 is formed with an oil pan 47' for the transmission 7.

Designated by numeral 47 is an oil pan for the engine 3.

As is seen FIG. 4, upon operation of the engine 3, the oil in the oil pan 47 is sucked by an oil pump 55 and fed through an oil passage 57 to given members, such as bearings 60 of crank-journals 59, crank pins 65 of connecting rods 63, and the like.

To the differential gear 9 located below the transmission 7, there are connected front right and front left drive shafts 67 and 67. See FIG. 2. The above-mentioned lower case 45 covers upper portions of the differential gear 9 and the drive shafts 67 and 67. To a lower surface of the lower case 45, there is mounted an end case 69 which covers lower portions of the differential gear 9 and the drive shafts 67 and 67.

As is illustrated by a broken line in FIG. 4, a torque converter Tc is arranged between the crankshaft 25 and the gear 29 when the transmission 7 is of an automatic type.

Figure 5:
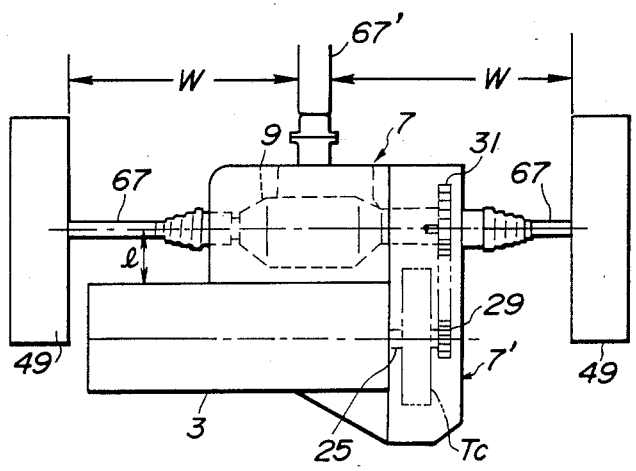
FIG. 5 is a plan view of a modification of the power unit of the preferred embodiment in a vehicle-mounted condition.
Figure 6:
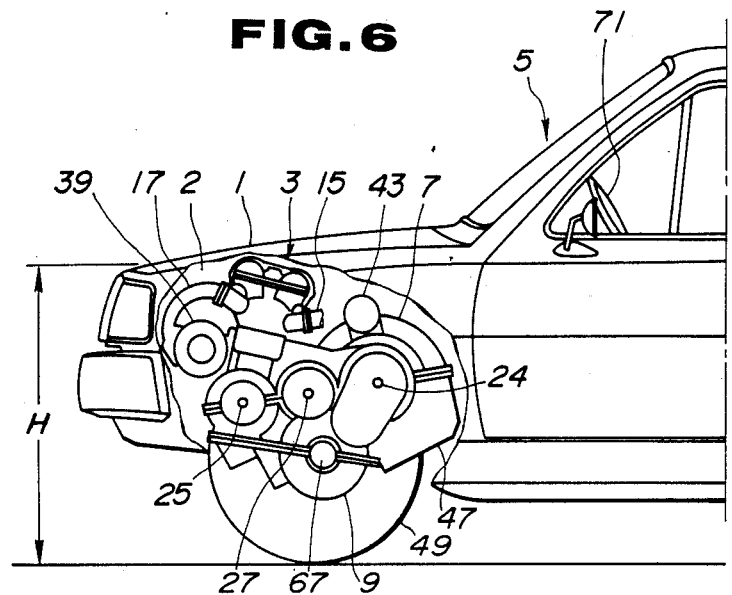
FIG. 6 is a partially cut-away side view of an engine-mounted front portion of a motor vehicle, showing a power unit mounted in the engine room, according to a second embodiment of the present invention.
Figure 7:
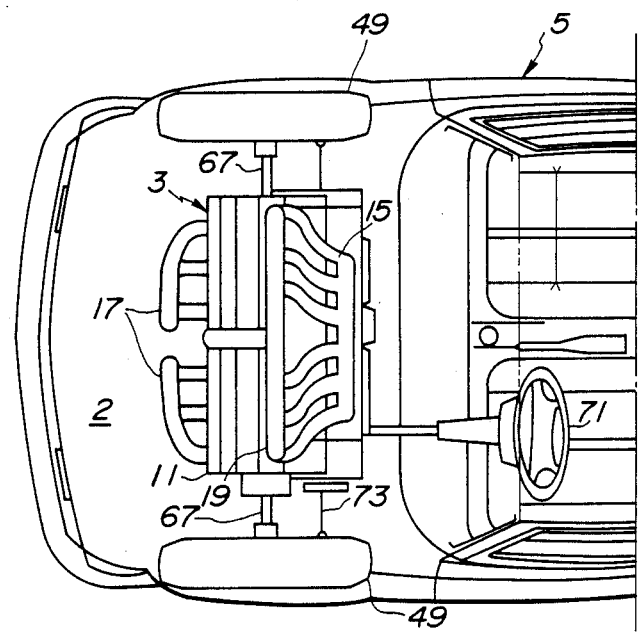
FIG. 7 is a view similar to FIG. 2, but showing the second embodiment.

FIG. 5 shows a modification of the power unit of the first embodiment, which is practically applied to a four wheel drive motor vehicle. An engine 3, a torque converter case 7', an automatic transmission 7 and a differential gear 9 are arranged in the illustrated manner. That is, the engine 3 and the transmission 7 are arranged in parallel and transversely mounted to the vehicle body with respect to fore-and-aft axis of the vehicle body. Designated by reference "l" is a space defined between the front right drive shaft 67 and the engine 3. The differential gear 9 illustrated by a broken line is located below the transmission 7. A propeller shaft 67' for driving the rear road wheels (not shown) extends rearward from the differential gear 7. Preferably, the propellar shaft 67' is arranged to extend along a center axis of the vehicle body.

Referring to FIGS. 6 to 9, there is shown a second embodiment of the present invention.

Since the second embodiment is similar to the first embodiment only, the parts and constructions different from those of the first embodiment will be particularly described in the following. The same parts and constructions are denoted by the same numerals in the drawings.

As will become apparent as the description proceeds, in the second embodiment the power of the engine 3 is delivered therefrom at a middle portion of crankshaft 25.

Figure 8:
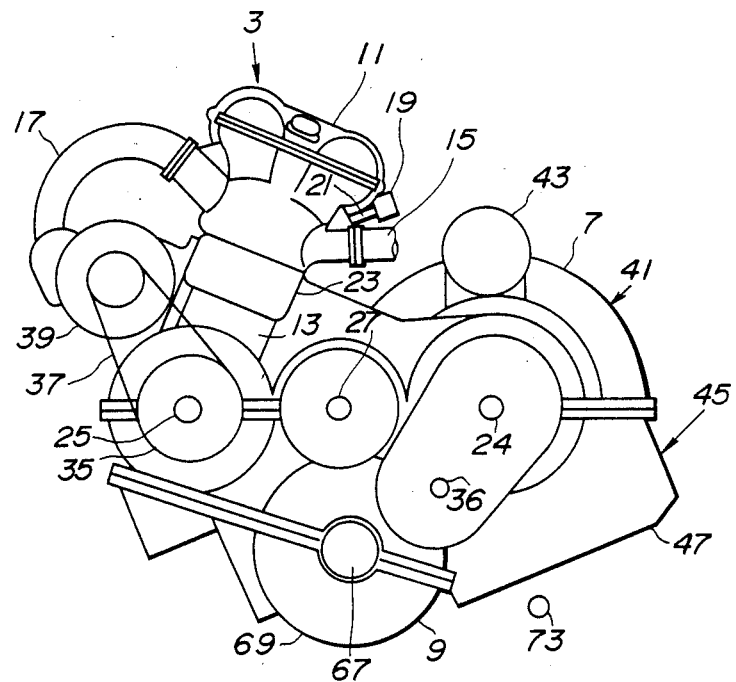
FIG. 8 is a view similar to FIG. 3, but showing the second embodiment.

As is seen from FIG. 8, similar to the first embodiment, a transmission 7 is arranged behind and alongside the engine 3. The torque generated at the crankshaft 25 of the engine 3 is transmitted to a gear shaft 24 of the transmission 7 through an intermediate shaft 27. As shown, the axes of the crankshaft 25, the gear shaft 24 and the intermediate shaft 27 lie on an imaginary common plane.

Figure 9:
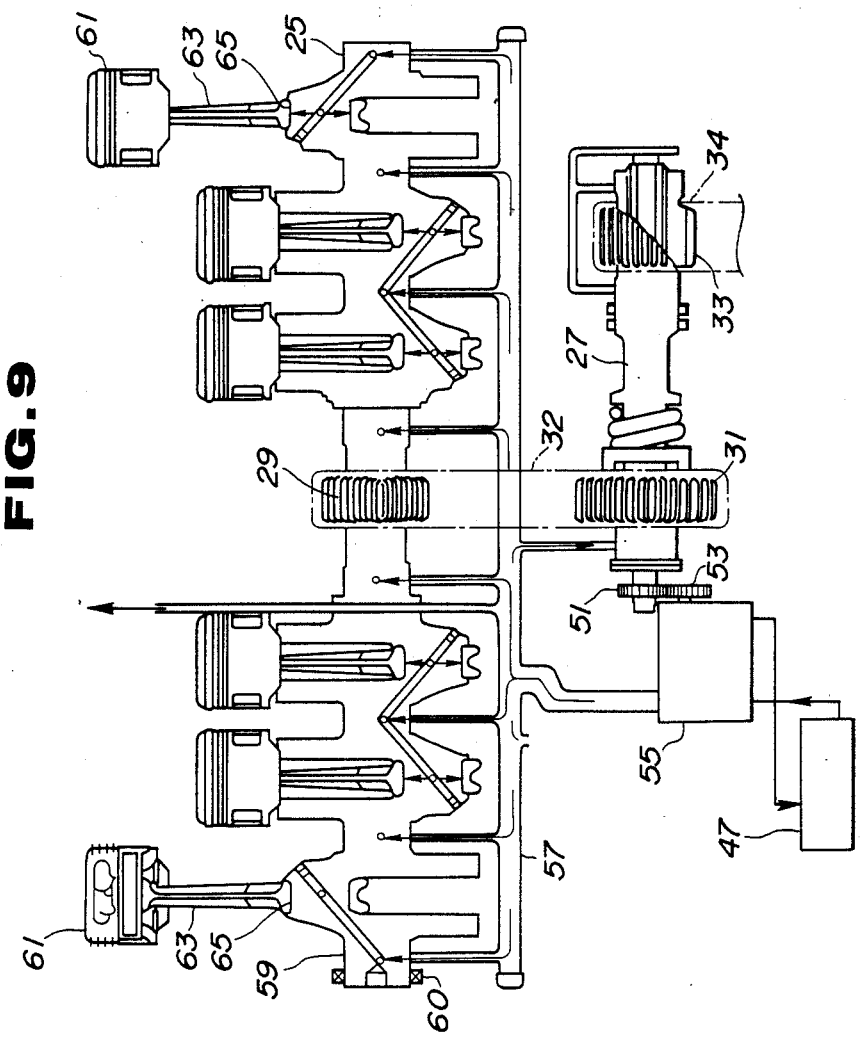
FIG. 9 is a view similar to FIG. 4, but showing the second embodiment.

The manner of the power output through the intermediate shaft 27 is schematically illustrated in FIG. 9.

In this embodiment, the crankshaft 25 has a gear 29 secured thereto at generally its middle portion, and the intermediate shaft 27 has at one end a first gear 31 and at the other end a second gear 33. The gear 29 and the first gear 31 are preferably connected operatively through a cogged belt 32 to achieve a power transmission connection between the crankshaft 25 and the intermediate shaft 27. The second gear 33 and a gear (not shown) mounted on the gear shaft 24 of the transmission 7 are operatively connected through a cog belt 34 to achieve a power transmission connection between the intermediate shaft 27 and the gear shaft 24. The power transmission from the gear shaft 24 to the differential gear 9 is made through a shaft (see FIG. 8) and several gears (not shown).

An upper case 41 covers respective upper portions of the intermediate shaft 27 and the gear shaft 24 and is bolted to the rear side of the cylinder block 13 of the engine 3. To a lower surface of the upper case 41, there is mounted a lower case 45 which covers respective lower portions of the crankshaft 25, the intermediate shaft 27 and the gear shaft 24. The lower case 45 is provided near the transmission 7 with an oil pan 47.

As is seen from FIG. 9, upon operation of the engine 3, the oil in the oil pan 47 is sucked by an oil pump 55 which is driven by the intermediate shaft 27 through gears 51 and 53, and the oil is fed through an oil passage 57 to given members, such as bearings 60 of crank-journals 59, crank pins 65 of connecting rods 63, and the like.

To the differential gear 9 located below the transmission 7, there are connected front right and front left drive shafts 67 and 67. See FIG. 7 The above-mentioned lower case 45 covers upper portions of the differential gear 9 and the drive shafts 67 and 67. To a lower surface of the lower case 45, there is mounted an end case 69 which covers lower portions of the differential gear 9 and the drive shafts 67 and 67.

In the following, advantages of the power unit of the present invention will be described.

First, because the transmission is arranged alongside the transmission, the power unit can be constructed relatively short in length. Thus, a longer engine, such as in-line 6 cylinder type engine, can be used for F—F type motor vehicle according to the present invention.

Second, since the transmission is arranged beside the engine and bolted to the same, the rigidity of the engine in the axial direction is increased and that of the outer wall of the transmission is also increased. As a result, undesired engine noise caused by vibration of the walls of the engine is lowered.

Third, since the differential gear can be mounted near the center of the engine, balanced supporting for the differential gear is achieved by the transmission to which the differential gear is integrally connected. Thus, durability of the differential gear is improved.

Fourth, since the power plant consisting of the engine, the transmission and the differential has the center of gravity at or at least near the middle portion between the front road wheels, steering of the wheels is achieved in a stable manner. Uneven wear of the tires is suppressed, hence tire life is extended and vehicle steering made safer.

Fifth, since the power unit is arranged with the engine somewhat inclined toward the rear of the vehicle body, a so-called "slanted nose structure" is easily available in a front portion of the vehicle body.

Sixth, in the case of the second embodiment, the power output is delivered from the middle portion of the crankshaft hence, the torsional vibration of the crankshaft is suppressed or at least minimized. This phenomenon elongates the life of the bearings used in the engine.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

What is claimed is:

1. A power unit suitable for use in a motor vehicle, comprising:
   an in-line engine having a crankshaft;
   a transmission having a gear-shaft, said transmission being arranged alongside said engine, with said crankshaft and said gear-shaft on parallel axes;
   power transmitting means for transmitting power from said engine to said transmission, said power transmitting means including an intermediate shaft disposed intermediate said crankshaft and said gear-shaft and rotationally engaged for transmitting power from said crankshaft to said gear-shaft, said intermediate shaft having an axis which is parallel with the axis of said crankshaft and lies on an imaginary plane on which the respective axes of said crankshaft and said gear shaft lie; and
   a differential gear operatively connected to said transmission,
   wherein said engine is inclined toward said transmission with respect to said imaginary plane.

2. A power unit as claimed in claim 1, wherein:
said differential gear is mounted beneath said transmission.

3. A power unit as claimed in claim 1, wherein:
said power transmitting means comprises
an output gear secured to one axial end of said crankshaft of said engine;
a first gear secured to said intermediate shaft; and
a chain operatively engaging said output gear and said first gear to achieve a power transmission connection between said crankshaft and said intermediate shaft.

4. A power unit as claimed in claim 3, wherein:
said transmission is of an automatic type, comprising a torque converter operatively arranged between said crankshaft of the engine and said output gear.

5. A power unit as claimed in claim 3, wherein:
said power transmitting means further comprises a second gear which is secured to said intermediate shaft and is operatively engaged with said gear-shaft of said transmission.

6. A power unit as claimed in claim 5, wherein:
said intermediate shaft has mounted thereon a driving gear which is meshed with a driven gear of an oil pump of said engine.

7. A power unit as claimed in claim 1, wherein:
said power transmitting means further comprises
an output gear secured to a generally middle portion of said crankshaft of said engine;
a first gear secured to said intermediate shaft; and
a first cog-belt operatively engaging said output gear and said first gear to achieve a power transmission connection between said crankshaft and said intermediate shaft.

8. A power unit as claimed in claim 7, wherein:
said power transmitting means further comprises a second gear which is secured to said intermediate shaft and is operatively connected to said gear-shaft through a second cog-belt.

9. A power unit as claimed in claim 8, wherein:
said intermediate shaft has mounted thereon a driving gear which is meshed with a driven gear of an oil pump of said engine.

10. A power unit as claimed in claim 8, wherein:
said transmission is of an automatic type, comprising a torque converter operatively arranged between said crankshaft of the engine and said output gear.

11. A power unit as claimed in claim 1, wherein:
said differential gear has an output member mounted thereto, said output member being adapted to connect with a drive shaft of a four wheel drive motor vehicle.

12. A power unit as claimed in claim 11, wherein:
said engine is of an in-line type and has at least four cylinders.

13. A power unit as claimed in claim 1, wherein:
said power unit is mounted to a front portion of a motor vehicle to drive front wheels thereof.

14. A power unit as claimed in claim 13, wherein:
said engine is of an in-line type and has at least four cylinders.

15. A power unit as claimed in claim 1, wherein:
said engine is of an in-line type and has at least four cylinders.

16. A power unit as claimed in claim 1, wherein:
said power unit is mounted to a front portion of a motor vehicle with the center of gravity of the power unit located substantially at a mid-position between the front wheels of said vehicle.

* * * * *